(12) United States Patent
Sivignon et al.

(10) Patent No.: US 11,858,638 B2
(45) Date of Patent: Jan. 2, 2024

(54) SYSTEM FOR REMOTE MONITORING OF AN AREA INTENDED TO ACCOMMODATE AT LEAST ONE PASSENGER OF AN AEROPLANE AND AEROPLANE CABIN EQUIPPED WITH SUCH A REMOTE MONITORING SYSTEM

(71) Applicant: Safran, Paris (FR)

(72) Inventors: Sébastien Sivignon, Brax (FR); Claude Martin, Lury sur Arnon (FR); Etienne Marecal, Villefontaine (FR); Ramon Blauwhoff, Leimuiden (NL)

(73) Assignee: Safran, Paris (FR)

( * ) Notice: Subject to any disclaimer, the term of this patent is extended or adjusted under 35 U.S.C. 154(b) by 598 days.

(21) Appl. No.: 16/500,468

(22) PCT Filed: Apr. 6, 2018

(86) PCT No.: PCT/EP2018/058943
§ 371 (c)(1),
(2) Date: Oct. 3, 2019

(87) PCT Pub. No.: WO2018/185332
PCT Pub. Date: Oct. 11, 2018

(65) Prior Publication Data
US 2020/0031474 A1 Jan. 30, 2020

Related U.S. Application Data

(60) Provisional application No. 62/486,777, filed on Apr. 18, 2017, provisional application No. 62/482,924, filed on Apr. 7, 2017.

(30) Foreign Application Priority Data

Jun. 7, 2017 (FR) ...................... 1755066

(51) Int. Cl.
*B64D 11/00* (2006.01)
*B64D 45/00* (2006.01)
(Continued)

(52) U.S. Cl.
CPC ...... *B64D 11/0015* (2013.01); *B64D 45/0056* (2019.08); *G08B 3/1008* (2013.01); *G08B 7/06* (2013.01); *G08B 21/02* (2013.01)

(58) Field of Classification Search
None
See application file for complete search history.

(56) References Cited

U.S. PATENT DOCUMENTS 4,112,818 A * 9/1978 Garehime, Jr. .... B64D 45/0042
109/9
6,166,625 A * 12/2000 Teowee ............... B60R 25/1004
250/342
(Continued)

FOREIGN PATENT DOCUMENTS

EP 0901963 3/1999
FR 30227718 4/2016
(Continued)

OTHER PUBLICATIONS

International Patent Application No. PCT/EP2018/058943, Search Report (including English translation and Written Opinion, dated Jun. 28, 2018.

*Primary Examiner* — Fekadeselassie Girma
(74) *Attorney, Agent, or Firm* — Kilpatrick Townsend & Stockton LLP (57) ABSTRACT

The invention relates to a system for remote monitoring of an area intended to accommodate at least one passenger of an aeroplane, notably a cargo area provisionally converted into cabin space, including:
at least one control member configured to generate at least one signal relating to the safety of the passenger present in the area, and (Continued)

at least one interface means that is situated at a distance from the area and allows the cabin crew to have access to information relating to the area and/or to the passenger present in the area on the basis of the signal.

15 Claims, 1 Drawing Sheet

(51) Int. Cl.
    *G08B 3/10*     (2006.01)
    *G08B 7/06*     (2006.01)
    *G08B 21/02*     (2006.01)

(56) References Cited

U.S. PATENT DOCUMENTS

| | | | |
|---|---|---|---|
| 6,366,311 B1 | 4/2002 | Monroe | |
| 6,831,680 B1* | 12/2004 | Kumler | G08B 13/19628 |
| | | | 348/148 |
| 6,864,805 B1* | 3/2005 | Gomez | H04N 7/181 |
| | | | 348/E7.086 |
| 6,961,445 B1* | 11/2005 | Jensen | G08B 13/194 |
| | | | 701/9 |
| 8,548,547 B2* | 10/2013 | Vij | A61B 5/18 |
| | | | 600/323 |
| 10,800,531 B2* | 10/2020 | Carlioz | B64D 11/0606 |
| 10,843,802 B2* | 11/2020 | Cailleteau | B64D 11/0641 |
| 2004/0145498 A1* | 7/2004 | Carroll | G08B 13/1965 |
| | | | 340/522 |
| 2005/0052339 A1* | 3/2005 | Sprague | G06F 3/147 |
| | | | 345/1.1 |
| 2006/0025900 A1* | 2/2006 | Arnouse | B64D 45/0034 |
| | | | 701/3 |
| 2007/0055434 A1* | 3/2007 | Kohlmann | B64C 13/20 |
| | | | 701/100 |
| 2008/0183344 A1* | 7/2008 | Doyen | G08G 5/0013 |
| | | | 701/9 |
| 2009/0273487 A1* | 11/2009 | Ferro | B64D 45/0026 |
| | | | 340/963 |
| 2010/0109912 A1* | 5/2010 | Stokes | B64D 45/0059 |
| | | | 340/945 |
| 2010/0277345 A1* | 11/2010 | Rodriguez | G01T 1/167 |
| | | | 340/945 |
| 2013/0160061 A1* | 6/2013 | Koch | G07C 5/0866 |
| | | | 725/76 |
| 2019/0177004 A1* | 6/2019 | Skelly | B64D 45/0059 |

FOREIGN PATENT DOCUMENTS

| | | |
|---|---|---|
| WO | 2011014940 | 2/2011 |
| WO | 2015181801 | 12/2015 |

* cited by examiner

SYSTEM FOR REMOTE MONITORING OF AN AREA INTENDED TO ACCOMMODATE AT LEAST ONE PASSENGER OF AN AEROPLANE AND AEROPLANE CABIN EQUIPPED WITH SUCH A REMOTE MONITORING SYSTEM

The present invention relates to a system for remote monitoring of an area intended to accommodate at least one passenger of an aeroplane, notably a cargo area, in particular provisionally or definitively and/or reversibly or irreversibly converted into cabin space. The invention also relates to an aeroplane cabin equipped with such a remote monitoring system.

In aeroplanes, in particular long-haul aeroplanes with two aisles, a lower deck comprises notably a cargo area, which is often under-utilised and/or hardly occupied. It has thus already been considered to convert the cargo area into a cabin space, i.e. a space intended to accommodate passengers, in particular in seats during the flight. Such an arrangement can be definitive or provisional and/or carried out reversibly or irreversibly. By provisional and/or reversible, this means an arrangement that could be quickly installed and uninstalled, according to needs, in order to use the cargo area either conventionally for transporting goods, or, as indicated above and according to the invention, to accommodate passengers.

The lower deck is made accessible from an upper deck usually accommodating passengers and cabin crew responsible for welcoming them, for their comfort and for their safety. The term "cabin crew" is here used to describe, as below in the description, all of the staff (stewardesses, stewards, etc.) working and having an operational function in the aeroplane during various phases of a flight, except for the crew flying the aeroplane. Likewise, it is also understood that the term "cabin crew" excludes passengers.

In the present description, the term "upper deck" means traditional spaces, where passengers sit in an aeroplane. Thus, in the aeroplane frame of the Boeing 747 or Airbus A380 type, the term "upper deck" comprises two superposed spaces, wherein the passengers take their place and are seated.

According to the directives and regulations currently in force on the date of the invention, the presence of passengers at the level of the lower deck is only permitted during flight periods outside of taxiing, take-off and landing phases. During these phases, all the passengers must be installed at the level of the upper deck.

There is an interest in limiting the permanent presence of the cabin crew at the level of the lower deck. Indeed, this is often a space of limited height, conventionally around one metre sixty, in which it seems appropriate to propose that passengers rest in a reclined position, and it seems difficult to ensure the presence of the cabin crew, who could be left in an uncomfortable position, notably standing up, for long periods.

The difficulty is thus to ensure the safety of passengers present at the level of the lower deck without the permanent presence of cabin crew being necessary.

The applicant has thus analysed the different roles of the cabin crew in this perspective, with the aim of identifying what should be implemented to overcome this difficulty.

The main situations requiring an intervention and/or a presence of the cabin crew are, non-exhaustively, as follows:
a passage of the aeroplane in an area of turbulence, such a situation being associated with the necessity to ensure that the passengers of the lower deck are correctly attached, notably to a seat and/or a sleeper, and/or
a depressurisation of the cabin, such a situation being associated with the necessity to ensure that the passengers of the lower deck have been equipped with an oxygen mask and that they have been able to correctly adjust it, and/or
health difficulties and/or passenger illnesses, such a situation being associated with the need for a suitable reaction from the cabin crew, and/or
threats, in particular coming from dangerous behaviour of certain passengers, such a situation being associated with the need for a suitable reaction from the cabin crew,
dangers, notably coming from the appearance of dangerous situations, in particular a fire, a fire risk, a gas or liquid leak presenting a potential risk, such a situation being associated with the need for a suitable reaction from the cabin crew.

Subsequently, the situations identified above will be called "abnormal situations".

The invention aims to resolve the difficulties identified above and proposes, in this sense, a system for remote monitoring of an area intended to accommodate at least one passenger of an aeroplane. The invention envisages, in particular, for a cargo area, provisionally or definitively and/or reversibly or irreversibly converted into cabin space.

To this end, the remote monitoring system according to the invention comprises, individually or in combination:
at least one control member, configured to generate at least one signal relating to the safety of the passenger present in said area,
at least one interface means, intended to be situated at a distance from the area and making it possible for a cabin crew to have access to information relating to the area and/or to the passenger present in said area on the basis of the signal.

Thanks to the remote monitoring system according to the invention, the cabin crew is able, at a distance, to monitor whether the passenger is in safe conditions. Likewise, the cabin crew is able, at a distance, to detect if abnormal situations are occurring. The presence of the cabin crew, or at the very least, the permanent presence of the cabin crew, at the level of the lower deck, can therefore be avoided.

According to complementary features of the invention, which can be taken together or separately:
the interface means comprises at least one display means, said display means comprises at least one digital device with a screen,
the interface means comprises at least one means for emitting an audible and/or visual and/or vibratory alert,
the remote monitoring system is configured to permanently update the information relating to the area and/or the passenger present in the area,
the remote monitoring system further comprises processing means, notably digital, making it possible to transmit the signal, notably in the form of digital data, to the interface means,
the remote monitoring system comprises a transmission network making it possible for a communication of the signal between the control members and the processing means and/or information relating to the remotely controlled area and/or to the passenger between the processing means and the interface means,
the control member comprises at least one sensor, capable of generating the signal relating to the safety of the passenger present in the area, said sensor(s) making it possible, in particular, to verify the status of a belt of
the passenger(s), to verify the use of oxygen masks by
the passenger(s), to detect the occurrence of a threat or
of a dangerous situation for the passenger(s) and/or to
monitor the health of the passenger(s), the sensor is a contact sensor, a presence sensor, a force
sensor, a temperature sensor, an optical sensor, a microwave sensor, an acoustic sensor, a gas flow sensor, a
body sensor, notably medical, a sound sensor, notably
a microphone, and/or an image sensor, notably a camera, said camera(s) are cameras functioning in the visible
spectrum, infrared cameras and/or thermal cameras, said camera(s) comprise(s) 2D cameras and/or 3D cameras, said remote monitoring system further comprises means
for processing information relating to the remotely
controlled area, notably means for processing images
and/or sounds, configured to process, respectively,
images picked up by said cameras and/or sounds picked
up by said microphones, said image processing means are configured to make a
comparison between the content of at least one of said
images picked up by said cameras and one or more
reference image(s), to detect shape and/or to detect
movement, said image processing means are configured to detect a
human form, a face, expressions of the face and/or to
locate passengers and/or objects, said sound processing means are configured to detect
frequency and/or amplitude, said sound processing means are configured to characterise a particular situation, to detect tones of voice and/or
particular noises, said control member(s) comprise an alert button and/or a
signalling button.

It will furthermore be advantageous to ensure a suitable
welcome and comfort for the passenger present in the area
controlled by the remote monitoring system. In other words,
it will be advantageous to use the functionalities of the
remote monitoring system, possibly completed with other
functionalities, for an improved welcome and comfort of the
passenger present in the area controlled by the monitoring
system.

For this, the monitoring system can comprise communication means making it possible for cabin crew to be put in
remote contact with the passenger present in the area.

Said communication means comprise, for example, audio
transmission means and/or video transmission means. They
can be configured to broadcast information to passengers
individually, in a group or together.

The communication means can be configured to function
automatically, and/or at the initiative of cabin crew and/or as
an interaction between the passenger present in the area and
the cabin crew.

The communication means can comprise at least one
alarm device transmitting a message adapted to all or some
of the passengers, notably to warn them of the existence
and/or of the nature of a threat and/or to ask them to evacuate
said remotely controlled area.

Said communication mean(s) can further comprise indicators configured to be activated upon the entry of a passenger into the area, notably in order to indicate to them the
place that is intended for them.

The invention also relates to an aeroplane cabin comprising a monitoring system such as described above.

According to different additional features of the invention, which can be taken together or separately:

said area has a configuration of limited height, said area has a height less than 1.6 metres, said area is a cargo area provisionally equipped to accommodate passengers, said area is equipped with sleeping modules for the passengers, said sleeping modules are removable so as to be able to be removed from the area as desired.

Of course, the different features, variants and/or embodiments of the present invention can be associated with one another according to various combinations insofar as they are not incompatible with or exclusive from one another.

The invention will be best understood and other features and advantages will also appear upon reading the following detailed description comprising embodiments given as an illustration in reference to the appended figures, presented as non-limiting examples, which can be used to complete the understanding of the invention and the summary of the embodiment thereof and, if necessary, contribute to the definition thereof, on which a practical example is present, illustrated according to a single FIGURE having, schematically in a transversal cross-section, an aeroplane cabin equipped with a remote monitoring system according to the invention.

Figure 1:
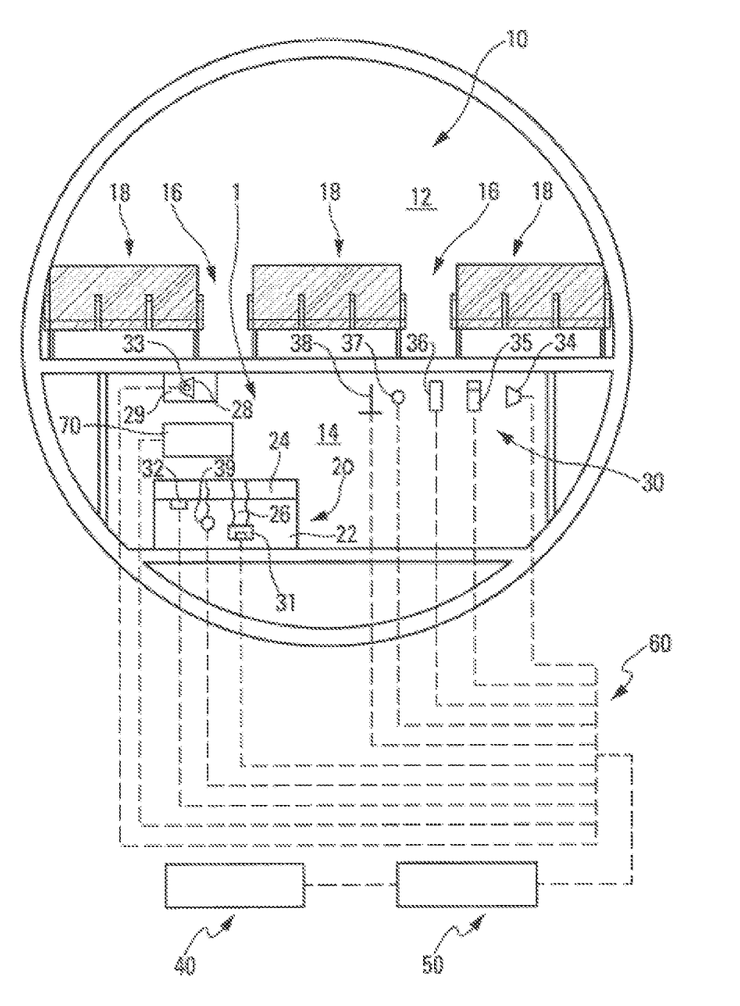

The invention relates to a remote monitoring system of an area 1 of an aeroplane intended to accommodate at least one passenger, and advantageously several passengers. The area 1 is also called, below in the description, "remotely controlled area".

As illustrated in FIG. 1, the remote monitoring system can, in particular, equip an aeroplane comprising a cabin 10 having an upper deck 12 and a lower deck 14. The lower deck 14 comprises, notably, a cargo area. According to the present invention, the cargo area is converted, in particular provisionally or definitively and/or reversibly or irreversibly, into cabin space.

According to the invention, the remotely controlled area 1 forms all or part of the lower deck 14, and more specifically the cargo area of the lower deck 14. However, in a variant, the remote monitoring system according to the invention can be tasked with monitoring other remotely controlled areas of the cabin 10, for example, cabin spaces accommodating passengers, situated in particular at the level of the upper deck 12, notably areas in which it is difficult to maintain the presence of cabin crew over a long period of time. The remote monitoring system according to the invention can also be tasked with monitoring all or part of an aeroplane cabin, with a single deck or multiple decks, for the purpose of reinforcing the safety of the passengers and/or reducing the cabin crew.

The upper deck 12, illustrated as an example in the FIGURE, comprises two aisles 16 and three rows of seats 18, notably with the aim of equipping aeroplanes intended for long-haul flights. Of course, such an arrangement is only indicative and numerous other alternative arrangements are possible and enter into the scope of the invention.

According to a particular embodiment, the remotely controlled area 1 can have a configuration of limited height, for example a height less than 2 m, even 1.8 m, even 1.6 m, notably in the central portion of the remotely controlled area 1.

In a specific embodiment, the remotely controlled area 1 is equipped, for example, with at least one sleeping module 20, advantageously several sleeping modules 20, intended to accommodate the passengers. The sleeping module 20, such as illustrated, comprises notably a base 22 and a mattress 24.

The sleeping module 20 is advantageously removable so as to be able to be removed from the remotely controlled area, as desired or as needed, so as to be able to return the lower deck 14 to the role of cargo area. Such a change can occur during short maintenance periods of the aeroplane. In a variant, the remote monitoring system according to the invention will also be applied in the case of lower decks permanently provided with an arrangement, notably sleepers, for passengers.

According to the directives and regulations currently in force on the date of the invention, the cargo area is free of passengers during taxiing, take-off and landing phases. It can only be occupied outside of these different specific phases.

Although this is not illustrated, the remotely controlled area 1 is made accessible from the upper deck 12, for example using a staircase. An access control device can be provided, notably, as mentioned above, to prevent the passengers from entering into the remotely controlled area 1 during the taxiing, take-off and landing phases.

According to the invention, the remote monitoring system comprises at least one control member 30. The control member 30 is configured to generate at least one signal relating to the safety of the passenger(s) situated in the remotely controlled area 1.

In order to ensure an optimal safety of the passengers in the remotely controlled area 1, the control member 30 comprises at least one sensor making it possible, individually or in combination:

- to indicate and/or to verify the status of a safety belt 26 of at least one passenger present in the remotely controlled area 1, notably in case of turbulences, and/or
- to indicate and/or to verify a use of oxygen masks 28, by at least one passenger present in the remotely controlled area 1, notably in case of depressurisation, and/or
- to detect an occurrence of a threat coming from at least one passenger present in the remotely controlled area 1, and/or
- to detect an occurrence of a danger or dangerous situation for at least one passenger present in the remotely controlled area 1, and/or
- to monitor a state of health and/or of stress of at least one passenger present in the remotely controlled area 1.

In the present description, reference is generally made to a passenger present in the remotely controlled area 1. However, it is understood that the invention is also applied in the case where several passengers are present in the remotely controlled area 1.

The control member 30 can comprise, for example, at least one sensor taken from among:

- a contact sensor, and/or
- a presence sensor, and/or
- a force sensor, and/or
- a temperature sensor, and/or
- an optical sensor, and/or
- a microwave sensor, and/or
- an acoustic sensor, and/or
- a gas flow sensor, and/or
- a body sensor, notably medical, and/or
- a sound sensor, notably a microphone, and/or
- an image sensor, notably a camera.

According to the invention, several individual sensors can be integrated into the same control member 30. Alternatively, the control member 30 comprises a single sensor.

Likewise, the present invention covers the embodiments in which several of the functions associated with the sensors identified above are integrated into a single multifunction sensor.

Thanks to such a combination of sensors making it possible, as necessary, to function redundantly, it is possible to detect all of the situations requiring that the cabin crew is warned.

The sensors are advantageously configured to generate and communicate, respectively or combined together, at least one signal, notably in digital form. According to a particular embodiment, in the context of sensors operaint in an analog manner, the remote monitoring system can comprise a converter, connected and/or paired with the sensors functioning in an analog manner, in order to transform the signal generated by the sensor into a digital signal.

The signal generated and communicated by at least one sensor is able tp provide information relating to the safety of the passenger situated in the remotely controlled area 1.

The remote monitoring system further comprises at least one interface means 40. In particular, the interface means 40 can be situated at a distance from the remotely controlled area 1, in order to make it possible for the cabin crew to have access to information relating to the remotely controlled area 1 and/or to the passenger on the basis of at least one signal generated and communicated by at least one sensor of the control member 30.

According to an elementary embodiment, the interface means 40 can be a single illuminated pictogram and/or a single light and/or a single siren indicating to the cabin crew that an intervention, notably of verification, is to be carried out in the remotely controlled area 1.

According to another embodiment, the interface means 40 comprises, for example, at least one display means. It can be at least one digital device with a screen, such as a control screen, advantageously configured to be installed on the upper deck 12 in a work area of the cabin crew and/or in the proximity of seats intended for the latter. It can also be at least one mobile device, such as a digital tablet, a personal assistant, a portable device, like a watch worn by the cabin crew. In other words, in this alternative of the invention, the interface means 40 is not, or at the very least has not, only a single illuminated pictogram and/or a single light and/or a single siren.

The interface means 40 can be configured to be shared by different members of the cabin crew. To this end, it can, in particular, further comprise at least one means to emit at least one audible alert and/or visual alert and/or vibratory alert, notably so as to attract the attention of the cabin crew with the aim that the latter knows that an event requires that they consult the interface means 40, in particular in detail and with attention, and/or that they go directly or intervene, for example for purposes of verification, in the remotely controlled area 1.

Moreover, preferably, the remote monitoring system is configured to permanently update the information relating to the remotely controlled area 1 and/or to the passenger on the basis of at least one signal generated and communicated by at least one sensor of the control member 30. In other words, in the absence of a change of signal generated and communicated by at least one sensor of the control member 30 and contributing to the information relating to the remotely controlled area 1 and/or to the passenger, the cabin crew can monitor the information made available by the interface means 40 with the assurance that the information is updated and reflects the situation relating to the remotely controlled area 1 and/or to the passenger in real time, i.e. similarly to the information available to the cabin crew can have if it was present in the remotely controlled area 1 and/or in the proximity of the passenger. In other words, even in the absence of an anomaly that should be communicated to the cabin crew, the interface means 40 is active or can be made active, notably following a command from the cabin crew, to make it possible for the cabin crew to carry out monitoring work remotely. In such a configuration, the interface means 40 signals, in this case, a normal situation.

Additionally, the remote monitoring system can comprise processing means 50, notably digital processing means 50. The processing means 50 make it possible to transmit the signal generated and communicated by at least one sensor of the control member 30. The transmission of the signal by the processing means 50 is done preferably in the form of digital data. The transmission of the signal by the processing means 50 is done towards the interface means 40, preferably in real time.

The processing means 50 are, for example, centralised in the form of a processing unit, such as a microprocessor. Advantageously, the processing unit is common to all the sensors and to the interface means 40. The processing means receives the digital signals coming from the sensors, ensures the processing thereof to generate the information relating to the remotely controlled area 1 and/or to the passenger to communicate and transmits them to the interface means in the form of data to be displayed, preferably sent to the cabin crew.

The remote monitoring system can also comprise a transmission network 60 making it possible for a communication:
of the signal between the control member 30 and the processing means 50, and/or
of information relating to the remotely controlled area 1 and/or to the passenger between the processing means 50 and the interface means 40.

The transmission network 60 can be, for example, a wired, electric and/or optical and/or wireless network, notably a network functioning with a protocol according to the wireless communication protocol norms suitable for air transport.

Moreover, the transmission network 60 can be independent or use all or part of the elements of an existing communication network in the aeroplane.

Different dangerous situations that the present embodiment of the monitoring system according to the invention is able to process, as well as the functioning of the monitoring system according to the invention and the associated equipment will now be detailed.

In a turbulence situation, the remote monitoring system is configured such that the control member 30 makes it possible to detect, at least:
the locked status of the safety belt 26, and/or
the presence of a passenger seated on a seat or reclined on a sleeper equipped with the safety belt 26 and capable of being retained by the safety belt 26.

Moreover, in case of the presence of several passengers in the remotely controlled area 1, the remote monitoring system is configured such that the control member 30 makes it possible to detect, for each passenger individually:
the locked status of the safety belt 26, and/or
the presence of a passenger seated on a seat equipped with the safety belt 26 and capable of being retained by the safety belt 26.

Thus, the remote monitoring system is configured such that the control member 30 makes it possible to transmit the information that the passenger is safe, respectively that all the passengers are safe.

For this purpose, according to a specific embodiment, the remote monitoring system comprises at least one connected belt, for example associated respectively with the sleeping module 20. The term "connected belt" is used to describe a safety belt 26 equipped with control members which can be, for example:
contact sensors 31, notably provided at the level of a buckle of the safety belt 26, to establish the "locked" or "unlocked" status of the safety belt 26, and/or
presence sensors, and/or
force sensors, such as stress gauges or force sensors to establish the presence of a passenger behind the safety belt 26.

In the example illustrated, a stress gauge 32 has been arranged between the base 22 and the mattress 24, for this very purpose.

Complementarily or alternatively, a signalling button not illustrated in the FIGURE can be used as a control member 30 according to the invention.

The signalling button makes it possible for the passenger to confirm that the safety belt 26 of the seat on which they are seated is correctly locked. The signalling button is advantageously connected to the processing means 50. It can be a signalling button dedicated to this function or a signalling button being used for other functions, such as being used as a switch for indicator lights and/or also other functions mentioned below in the description.

In a depressurisation situation, in particular of the remotely controlled area 1, the remote monitoring system is configured to establish that the passenger is safe. Such safety can be achieved, in particular, by the passenger wearing the oxygen mask 28 provided for this purpose. In particular, the remote monitoring system is configured to establish that the passenger, respectively all the passengers, has/have been able put on an oxygen mask 28. In addition, advantageously, the remote monitoring system is configured to establish that the oxygen mask 28 worn by the passenger is correctly adjusted.

To this end, in one embodiment example, the oxygen mask 28 is provided, advantageously in the proximity of the sleeping module 20, in a housing 29 likely to be opened in case of depressurisation and making it possible for the oxygen mask 28 to drop by gravity out of the housing 29.

More generally, the remotely controlled area 1 comprises at least one oxygen distribution unit equipped with one or more oxygen masks 28. Preferably, an oxygen distribution unit comprising one or more oxygen masks 28 is provided for each sleeping unit 20. Other oxygen distribution units can be provided in other parts of the remotely controlled area 1, such as, for example, in the aisles and/or in other areas where the passenger is likely to pass or stay. The oxygen distribution units are configured to release and expel the oxygen masks automatically in case of depressurisation.

To ensure the safety of the passenger, at least one of the following indications is utilised:
activation/deactivation of the oxygen mask 28, and/or
use/non-use of the oxygen mask 28, and/or
presence of the passenger in the remotely controlled area 1.

The control member 1 being used to establish whether the oxygen mask 28 has been activated (or not) comprises, for example, at least one sensor arranged on the oxygen mask 28 and/or in the associated oxygen distribution unit. In this case, it can be, for example, a stress gauge 33, or a force sensor 33, making it possible to establish that a passenger has activated the oxygen mask 28, notably by pulling on the oxygen mask 28, in order to enable oxygen distribution, and is supposed to have applied the oxygen mask 28.

In another embodiment, the control member 1 being used to establish whether the oxygen mask 28 is used (or not) comprises, for example, at least one sensor arranged on the oxygen mask 28 and/or in the associated oxygen distribution unit. In this case, it can be, for example, a gas flow sensor, making it possible to establish that a passenger is breathing the oxygen delivered by the oxygen mask 28.

The control member 1 being used to establish whether at least one passenger is present comprises, for example, at least one sensor arranged in the remotely controlled area 1, notably in the sleeping unit and/or in the proximity of an entrance of the remotely controlled area 1. Advantageously, the control member 1 being used to establish whether at least one passenger is present comprises several sensors arranged in different places of the remotely controlled area 1.

As an example, it can be a simple counting of passengers or an individualised piece of information, even an identification of the passengers in question. The control member 1 comprises, for example, at least one presence sensor, such as the presence sensors of the safety belt 26 mentioned above, and/or the stress gauge 32 being used to establish the presence of a passenger behind the safety belt 26. It can also be stress gauges or force sensors arranged in various places of the remotely controlled area 1.

Complementarily or alternatively, a signalling button, not illustrated in the FIGURE, can be used as a control member 30 according to the invention. The signalling button makes it possible for the passenger to confirm that the oxygen mask 28 is activated and functional and that the passenger is safe in case of depressurisation. The signalling button is advantageously connected to the processing means 50. It can be a signalling button dedicated to this function or a signalling button being used for other functions, such as a switch for indicator lights and/or other functions mentioned in the present description.

The control member 1 being used to establish whether at least one passenger is present comprises, alternatively or cumulatively, as an example, at least one counter gateway. In such an arrangement, the counter gateway can be situated at the entrance of the remotely controlled area 1.

Moreover, the control member 1 being used to establish whether at least one passenger is present comprises, alternatively or cumulatively, for example, at least one communication device, in particular a near-field communication device, such as an RFID chip reader associated with at least one RFID chip worn by the passenger. The control member 1 can thus make it possible to establish the presence of a passenger in the remotely controlled area 1, anonymously and/or by identifying the passenger.

In addition, the control member 1 being used to establish whether at least one passenger is present comprises, alternatively or cumulatively, for example, presence sensor means, such as a camera. Ideally, the presence sensor means is associated with at least one image processing means, as will be detailed below. Alternatively, the presence sensor means can be a laser sensor or a sensor of the sonar type.

In case of threats coming from the passenger present in the remotely controlled area 1, the remote monitoring system is configured to detect and/or identify such a situation, notably an inappropriate attitude of the passenger, or any other situations putting passengers in danger, such as a terror attack or a hijacking of the aeroplane.

The control member 30 being used to establish the existence of such a threat comprises, for example, at least:
one motion detection device, and/or
one image recording device 34 such as a camera 34, and/or
one sound recording device 35, such as a microphone 35.

The devices identified in the present description are configured to form, individually or in combination, a device for recording information relating to the remotely controlled area 1 and/or to the passenger on the basis of the signal generated and communicated by at least one sensor of the control member 30.

Complementarily or alternatively, the remote monitoring system is configured such that the device for recording information relating to the remotely controlled area 1 and/or to the passenger transmits the signal relating to the remotely controlled area 1 and/or to the passenger, namely the images and/or the sounds recorded and/or the presence information, in particular in case of movement, to the interface means 40. Thus, the interface means 40 is capable of making it possible to, notably, view the images and/or hear the sounds of the remotely controlled area 1, advantageously without processing.

In a variant, the remote monitoring system further comprises means for analysing information relating to the remotely controlled area 1 and/or to the passenger, notably images and/or sounds. The means for analysing information relating to the remotely controlled area 1 and/or to the passenger make it possible characterise specific situations, notably by using pre-established models.

The motion detection device comprises, for example, at least one optical motion sensor 37 and/or at least one microwave motion sensor 38 and/or at least one acoustic motion sensor, notably an ultrasound sensor.

The image recording device 34 can be, notably, at least one camera 34 functioning in the visible spectrum and/or at least one infrared camera, in particular associated with an infrared lighting device, and/or at least one thermal camera. The cameras used comprise 2D cameras and/or 3D cameras, for example, with the aim of establishing the deep positioning of the passenger and/or of an object present in the remotely controlled area 1. The signals generated by the cameras can take the form of a data matrix associating with pixels separating the image(s) recorded from the grey or colour levels, for example RGB, possibly completed by a depth value in the case of 3D cameras.

The sound recording device 35 can be, for example, at least one dynamic microphone and/or condenser microphone. The sound recording device 35 can be one-directional, two-directional, cardioid and/or multidirectional. Moreover, the sound recording device 35 can also be at least one stereo microphone. Such a stereo microphone makes it possible to contribute to the localisation of the sound source, alternatively of the sound sources. Finally, the sound recording device 35 can also be configured to capture sounds corresponding to dedicated sound frequencies and/or sound frequencies outside of dedicated sound frequencies and/or sound frequencies outside of such frequencies.

The control member 30 forming the recording device is positioned in the remotely controlled area 1 so as to cover all of the remotely controlled area 1 or, at the very least, defined portions, for example those determined as the most sensitive, of the remotely controlled area 1, advantageously redundantly and/or under different viewing angles.

The means for analysing information relating to the remotely controlled area 1 and/or to the passenger are configured, for example, to isolate the face of the passenger and/or identify, from data collected by the recording device, facial expressions of the passenger in order to deduce from them at least one piece of information relating to the passenger. Such facial expressions of the passenger can indicate pain, stress, a feeling of panic, anger, fear, an absence of reaction and/or any other expression which could correspond to a situation of threat, risk or danger.

Complementarily or alternatively, the means for analysing information relating to the remotely controlled area 1 and/or to the passenger are configured, for example, to identify and/or detect objects considered as dangerous such as firearms, sharp objects or more generally, any blunt or dangerous object. Also, the means for analysing information relating to the remotely controlled area 1 and/or to the passenger can be configured, for example, to identify and/or detect chemical and/or toxic substances, or also tanks containing flammable materials and/or gas. Moreover, the means for analysing information relating to the remotely controlled area 1 and/or to the passenger can be configured, for example, to identify and/or detect an emanation of a toxic substance and/or smoke.

Complementarily or alternatively, the means for analysing information are configured, for example, to identify abnormal behaviour of the passenger or of a group of passengers. This can, for example, be a group of passengers grouped together, or an agitated behaviour of a passenger. This can also, for example, be a detection of an initial, non-natural behaviour, notably the passenger crouching down, stretching out, falling or any other behaviour considered initially suspect. Finally, this can also be a behaviour revealing a state of drunkenness of the passenger or any other inappropriate behaviour for a passenger in an aeroplane.

According to the data established thanks to the means for analysing information, the remote monitoring system is configured, for example, such that the interface means 40 generates, in particular, at least one indication, notably in the form of a colour and/or text code, relating to the situation identified, possibly completed by an image of the relevant scene(s). According to an embodiment example, these indications can be made in augmented reality, for example with highlighted edges, appearance of a text window in a superimposition of screen or other images.

In particular, for this purpose, the analysis means of the information, in particular of the images, relating to the remotely controlled area 1 and/or to the passenger are configured, for example, to make a comparison between the content of at least one of the images picked up by the image recording device 34 and one of the reference images, in particular
 to establish a change of situation, and or of behaviour, and/or
 to detect a shape and/or a temperature,
 to determine the expressions of a face and/or a state of stress and/or apathy, and/or
 to detect a presence of a dangerous object, and/or
 to detect a movement, etc.
in particular by comparing images recorded by the image recording device 34 at different times, in particular to establish unexpected behaviour. In other words, the information analysis means are configured to detect particular objects, a human form, a face, facial expressions and/or to achieve a localisation of passengers and/or objects.

The analysis means of information, in particular of sounds, are configured, for example, to
 perform a frequency and/or amplitude detection, and/or
 characterise a particular situation, such as a situation of panic and/or a situation of stress, and/or
 detect tones of voice and/or particular noises.
It can be yelling, complaining, moaning, crying or others. It can also be shouting, threatening tones or others. It can also be particular noises generated by objects, such as firearms that are loaded, shots, explosions, noises of falling objects and/or passengers or others. Complementarily or alternatively, the information analysis means are configured, for example, to make it possible to listen and/or understand and/or interpret sounds captured in the remotely controlled area 1.

The control member 30 can further advantageously comprise an alert button.

The alert button can be the same as the signalling button already mentioned. The alert button can also be a specific button in order to clearly associate an activation of the alert button to a threat situation and/or requiring an intervention and/or a presence of the cabin crew.

The alert button will thus make it possible for a passenger to request the presence and/or the help of and/or the intervention of the cabin crew, in particular if they witness a threat situation and/or a situation requiring an intervention and/or a presence of the cabin crew. One or more specific alert buttons can also be provided and made available to the passenger, each button respectively corresponding to a threat level felt by the passenger.

The alert button is located, for example, on a ceiling and/or a wall of the sleeping module. The alert button can also be located, for example, on a ceiling and/or a wall of the toilets situated in the remotely controlled area 1 or passage areas of the remotely controlled area 1. The alert button can furthermore be integrated to in-flight entertainment devices, such as areas of a touchscreen, for example dynamically activated areas, in particular likely to equip the sleeping module.

The alert button can be connected to same components of the interface means 40 and/or the processing means 50 as the other control member(s) 30 or to specific components, in particular in order to ensure redundancy.

An activation of the alert button generates, for example, the display and/or the transmission of a message intended for the cabin crew by the interface means 40.

In case of a medical difficulty, in particular of the passenger present in the remotely controlled area 1, the remote monitoring system can use the control member already described and/or several control members already described and/or specific control members such as at least one medical data sensor 39, such as, for example, a physiological sensor, such as, in particular, a device for detecting a heart rate. The medical data sensor 39 can be arranged or integrated in the remotely controlled area 1, alternatively in the cabin, or worn by the passenger, such as a connected bracelet or watch.

The remote monitoring system can also use the information analysis means, in particular of images and/or of sounds, to contribute to the detection of a situation requiring a reaction of a medical nature. Such a situation can, for example, be identified by the detection of excessively heavy breathing, suffocation, cries of pain, moans or complaints from the passenger. It can, complementarily or alternatively, also be identified by a detection of images of a fall, an injury, bleeding, suffocation or other of the passenger.

The remote monitoring system can also use, alternatively or complementarily, the alert button, possibly adapted to make it possible for the passenger to specify a medical nature of the alert. One or more specific alert buttons can also be made available to the passenger, each button respectively corresponding to a particular type of situation. The button can be used to transmit a message asking for assistance, either by the passenger in question or by a passenger witnessing the situation. The interface means 40 can also be adapted to establish medical indications from information received, in particular intended for a doctor, in the case where there would be one on board, or, in an adapted version, intended for the cabin crew.

The remote monitoring system can, furthermore, comprise a monitoring centre, on board and/or on the ground, for medical information. To this end, the remote monitoring system comprises means for transmitting medical indications to the monitoring centre, for example from the interface means 40 and/or from the processing means, using the information collected on board the aeroplane.

Alternatively or complementarily, the remote monitoring system, in particular the interface means 40, can also be adapted to establish, directly or indirectly, a communication enabling to obtain a diagnosis from a person, notably a doctor, located on the ground.

Likewise, for situations having a dangerous character, the monitoring system can use the components already described, notably the sensor(s) and/or button and/or the signal(s) generated and communicated by the sensor(s) and/or, possibly, the adapted button(s), and/or specific components. The remote monitoring system is, in particular, configured to consider the presence of substances or dangerous products, in this case, fire, smoke emission, the dispersion of a dangerous fluid or other.

Of course, to limit such a risk, the materials used to equip the remotely controlled area 1 preferably comprise fireproof materials. Moreover, the passenger will have been informed prior of the behaviour to adopt. That being, the remote monitoring system will contribute to a quick and appropriate reaction making it possible to limit the damage caused.

The control member 30 can comprise, in this sense, at least one smoke detection sensor and/or at least one gas analyser and/or at least one temperature sensor 36 or other sensor making it possible to detect situations having a dangerous character, notably the presence of substances or dangerous products, in this case fire, smoke emission, the dispersion of a dangerous fluid or other. A thermal camera can also be used.

In these different situations, the interface means 40 is, for example, configured to define different alert levels, corresponding, notably, to the difference types of reaction to implement by the cabin crew. The types of reactions are, for example:

- on-screen viewing of the remotely controlled area 1 for a low-level alert, and/or
- visiting the remotely controlled area 1 for a higher-level alert, and/or
- evacuating the remotely controlled area 1 for a higher-level alert and/or
- activating safety members, notably fire extinguishers provided in the remotely controlled area for appropriate situations.

The interface means 40 can also, for example, be configured to deliver a list of passengers present and/or a confirmation message certifying the absence of passengers in the remotely controlled area 1, stemming notably from data delivered by the processing means 50.

It will furthermore be advantageous to use functionalities of said remote monitoring system, possibly in combination with other functionalities, in order to ensure an appropriate welcome and comfort of the passenger in the controlled area 1 by the remote monitoring system.

To achieve this, the remote monitoring system can, for example, comprise communication means making it possible for the cabin crew to be put in remote contact with the passenger present in the remotely controlled area 1. The communication means comprise, for example, audio and/or video transmission means 70, notably a screen 70. The communication means can be configured to transmit information to the passengers individually, to a group of passengers or to all the passengers.

The communication means can be, for example, configured to function automatically and/or at the initiative of the cabin crew and/or in interaction between the passenger present in the remotely controlled area 1 and the cabin crew, notably in an intercom mode. The communication means are intended to emit, for example, images and/or messages for the purpose of providing information, to reassure the passengers, notably indicating to them that a member of the cabin crew has been alerted and/or is on the point of coming to the remotely controlled area 1, to give them advice, give them instructions and/or recommendations. The images and/or messages emitted are pre-recorded and/or transmitted directly by the cabin crew.

In case of automatic functioning, the communication means are, for example, configured to be activated after identification of a particular situation by the information analysis means and/or an activation of the signalling button and/or of the alert button.

The communication means can also be configured to transmit a message requiring the confirmation of the information received, notably in the case of medical information and/or request for assistance, in particular to the passenger having activated the alert button.

That being, an image recording device 34 can in particular be provided for each sleeper. In such an event, the remote monitoring system can comprise activation/deactivation means for the image recording device 34. For example, the activation/deactivation means are configured, in a normal mode, to enable the functioning of the image recording device 34, after authorisation given by the passenger using the sleeper. To this end, the authorisation can be obtained using one of the buttons already mentioned, and/or any other validation device. In an emergency mode, the remote monitoring system can be configured, for example, to force the activation and the functioning of the image recording device 34, in particular with or without the authorisation of the passenger.

The communication means can further comprise at least one alarm device transmitting a message adapted to all or some of the passengers to warn them of the existence and/or of the nature of a threat and/or to request them to evacuate the remotely controlled area 1. The remote monitoring system is configured such that the alarm device is activated, for example, at the initiative of a member of cabin crew, in the event of particular situations, established by the information analysis means relating to the remotely controlled area 1 and/or in case of actuating the alert button and/or the signalling button.

In a particular embodiment, the remote monitoring system is configured such that the interface means 40 proposes to emit an alarm in case of particular situation according to the signal generated and communicated by at least one control member 30 and/or to the activation of one or more alert button(s) and/or one or more signalling button(s). The cabin crew is thus free (or not) to activate the alarm device.

In another embodiment, the remote monitoring system is likely to be configured such that the alarm device is activated according to the signal generated and communicated by at least one control member 30 and/or to the activation of one or more alert buttons and/or one or more signalling buttons, without intervention of a member of cabin crew and/or confirmation of a certain degree of threat by the information analysis means relating to the remotely controlled area 1 and/or to the passenger.

The alarm device comprises, for example, output devices of the same nature as the interface means sent to the cabin crew. The output devices can be, for example, situated notably in the immediate proximity of the signalling buttons.

The remote monitoring system is, for example, configured such that the communication means, in particular the alarm device, can be controlled by the cabin crew, notably using the interface means 40 or specific components.

The communication means can further comprise indicator lights and/or illuminated signposting, screens and/or sound transmission devices configured to be activated as the passenger steps into the remotely controlled area 1 in order to indicate to them the place which is intended for them.

The remote monitoring system further comprises a system for powering the control member 30 and/or the interface means 40 and/or the processing means 50. To this end, the power supply system can be constituted of the transmission network 60, configured to also circulate a supply current. Advantageously, the power supply system is autonomous and independent from any another power supply system of the aeroplane.

Of course, the invention is not limited to the embodiments described above and provided only as an example. It comprises various modifications, alternative forms and other variants that a person skilled in the art can consider in the scope of the present invention and notably all combinations of different operating modes described above, could be taken separately or in association.

The invention claimed is:

1. Remote monitoring system for a cargo area intended to accommodate at least one passenger of an aeroplane, comprising:
   at least one control member comprising a sensor, the sensor comprising at least one of:
   an automatic presence sensor;
   a force sensor;
   a microwave sensor; and/or
   a gas flow sensor,
   wherein the sensor is configured to generate at least one signal relating to the safety of the at least one passenger present in the cargo area by at least one of:
   checking a state of a belt of the at least one passenger;
   checking a use of an oxygen mask by the at least one passenger;
   and/or
   monitoring health of the at least one passenger;
   wherein the status of the belt, the use of the oxygen mask, and/or the health of the passenger is detected by the sensor, and
   at least one interface means intended to be situated at a distance from the cargo area and making it possible for a member of cabin crew to have access to information relating to the cargo area and/or to the passenger present in the cargo area on the basis of the signal, the signal relating to the safety of the passenger being forwarded to the cabin crew through the interface, wherein the at least one passenger is a person.

2. Remote monitoring system according to claim 1, wherein the interface means comprises at least one display means, notably comprising at least one digital device with a screen.

3. Remote monitoring system according to claim 1, wherein the interface means comprises at least one means to emit at least one audible and/or visual and/or vibratory alert.

4. Remote monitoring system according to claim 1, wherein the remote monitoring system is configured to permanently update the information relating to the cargo area and/or to the passenger present in the cargo area.

5. Remote monitoring system according to claim 1, wherein said remote monitoring system further comprises processing means making it possible to transmit the signal to the interface means.

6. Remote monitoring system according to claim 5, wherein said remote monitoring system comprises a transmission network making it possible for communication of the signal between the control member and the processing means and/or information relating to the remotely controlled cargo area and/or to the passenger between the processing means and the interface means.

7. Remote monitoring system according to claim 1, wherein the sensor is a first sensor, wherein the remote monitoring system further comprises a second sensor, the second sensor comprising at least one of a contact sensor, and/or a presence sensor, and/or a force sensor, and/or a temperature sensor, and/or an optical sensor, and/or a microwave sensor, and/or an acoustic sensor, and/or a gas flow sensor, and/or a body sensor, and/or a sound sensor, and/or an image sensor.

8. Remote monitoring system according to claim 1, wherein the remote monitoring system further comprises means for processing information relating to the remotely controlled cargo area and/or to the passenger.

9. Remote monitoring system according to claim 1, wherein the control member comprises an alert button and/or a signaling button.

10. Remote monitoring system according to claim 1, wherein communication means are arranged to make it possible for the cabin crew to be put in contact with the passenger present in the cargo area.

11. Remote monitoring system according to claim 10, wherein the communication means are configured to function automatically, and/or at the initiative of the cabin crew and/or in interaction between the passenger present in the cargo area and the cabin crew.

12. Remote monitoring system according to claim 10, wherein the communication means comprise at least one alarm device transmitting a message adapted to all or some of the passengers.

13. Remote monitoring system according to claim 10, wherein the communication means comprise indicators configured to be activated as the passenger enters the cargo area, notably in order to indicate to them the place that is intended for them.

14. Aeroplane cabin comprising a remote monitoring system according to claim 1.

15. Remote monitoring system for a cargo area intended to accommodate at least one passenger of an aeroplane, comprising:
   at least one control member configured to generate at least one signal relating to the safety of the at least one passenger present in the cargo area; and
   at least one interface means intended to be situated at a distance from the cargo area and making it possible for a member of cabin crew to have access to information relating to the cargo area and/or to the passenger present in the cargo area on the basis of the signal, wherein the at least one control member comprises at least one sensor chosen among:

a contact sensor; and/or
an automatic presence sensor; and/or
a force sensor; and/or
a microwave sensor; and/or
a gas flow sensor; and/or
a body sensor,
wherein the at least one sensor is configured to generate the signal relating to the safety of the passenger present in the area based on a status of a belt of the at least one passenger, a use of an oxygen mask by the at least one passenger, and/or a monitored health of the passenger,
wherein the status of the belt, the use of the oxygen mask, and/or the health of the passenger is detected by the sensor, and
the signal relating to the safety of the passenger being forwarded to the cabin crew through the interface.

\* \* \* \* \*